US012780728B2

(12) United States Patent
Ren et al.

(10) Patent No.: US 12,780,728 B2
(45) Date of Patent: Nov. 3, 2026

(54) LOW-CARBON CEMENT CLINKER AND METHOD FOR PREPARING THE SAME

(71) Applicants: China Building Materials Academy Co., Ltd., Beijing (CN); China National Building Material Group Co., Ltd., Beijing (CN)

(72) Inventors: Xuehong Ren, Beijing (CN); Lixue Cao, Beijing (CN); Xiao Zhi, Beijing (CN); Wensheng Zhang, Beijing (CN); Jiayuan Ye, Beijing (CN); Nan An, Beijing (CN); Hongtao Zhang, Beijing (CN); Wenjuan Cui, Beijing (CN)

(73) Assignees: China Building Materials Academy Co., Ltd., Beijing (CN); China National Building Material Group Co., Ltd., Beijing (CN)

( * ) Notice: Subject to any disclaimer, the term of this patent is extended or adjusted under 35 U.S.C. 154(b) by 384 days.

(21) Appl. No.: 18/536,139

(22) Filed: Dec. 11, 2023

(65) Prior Publication Data

US 2024/0190764 A1 Jun. 13, 2024

Related U.S. Application Data

(63) Continuation-in-part of application No. PCT/CN2023/111955, filed on Aug. 9, 2023.

(30) Foreign Application Priority Data

Dec. 8, 2022 (CN) ........................ 202211569679.7

(51) Int. Cl.
*C04B 7/43* (2006.01)
*C04B 7/34* (2006.01)
*C04B 7/47* (2006.01)
*C04B 7/52* (2006.01)

(52) U.S. Cl.
CPC ................ *C04B 7/434* (2013.01); *C04B 7/34* (2013.01); *C04B 7/47* (2013.01); *C04B 7/52* (2013.01)

(58) Field of Classification Search
CPC .. C04B 7/434; C04B 7/34; C04B 7/47; C04B 7/52; C04B 7/147; C04B 7/345; C04B 7/361; C04B 7/323; Y02P 40/10
See application file for complete search history.

(56) References Cited

U.S. PATENT DOCUMENTS

2017/0050882 A1* 2/2017 Zhang .................. C04B 7/3453

* cited by examiner

*Primary Examiner* — Pamela H Weiss
(74) *Attorney, Agent, or Firm* — MATTHIAS SCHOLL P.C.; Matthias Scholl

(57) ABSTRACT

A low-carbon cement clinker, having the following parameter ranges: alkalinity coefficient C: 1.0≤C≤1.5; aluminum-sulfur ratio P: P<1.92; aluminum-silicon ratio N: N<1; and limestone saturation coefficient Cs: 0.9≤Cs<1.0. The specific range of each parameter value ensures an idea ratio of mineral composition in the low-carbon cement clinker. The ratio promotes a coordinated interaction among different minerals and compounds present when exposed to water, leading to improved strength development and overall performance of the final cement product.

4 Claims, 2 Drawing Sheets

LOW-CARBON CEMENT CLINKER AND METHOD FOR PREPARING THE SAME

CROSS-REFERENCE TO RELATED APPLICATIONS

This application is a continuation-in-part of International Patent Application No. PCT/CN2023/111955 with an international filing date of Aug. 9, 2023, designating the United States, further claims foreign priority benefits to Chinese Patent Application No. 202211569679.7 filed Dec. 8, 2022. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the field of cement preparation, and more specifically, to a low-carbon cement clinker and a method for preparing the same.

Within Portland cement, the primary contributor to strength is the alite mineral (a solid solution of tricalcium silicate, $C_3S$), which forms at approximately 1450° C., featuring a substantial CaO content up to 73.7%. Hence, the elevated carbon emissions associated with Portland cement clinker primarily stem from the high-temperature formation process of the alite minerals. When compared to belite (a solid solution of dicalcium silicate, $C_2S$) that contains a 65.1% CaO and swiftly forms at temperatures exceeding 1250° C., belite demonstrates reduced carbon emissions along with a proportional decrease in energy consumption and carbon emissions. Anhydrous calcium sulfoaluminate ($C_4A_3\$$) features a CaO content of 36.8% and forms at a lower temperature (1300° C.). Furthermore, calcium sulfosilicate (ternesite, $C_5S_2\$$), containing 58.33% CaO, emerges from the reaction between belite and anhydrite at temperatures ranging from 1150 to 1250° C. Therefore, both of these mineral materials exhibit energy-saving properties and contribute to low emissions. By conducting thorough calculations of carbon emissions, it has been determined that the carbon emissions of different minerals, namely $C_3S$, $C_2S$, $C_4A_3\$$, and $C_5S_2\$$, amount to 579 kg/t, 511 kg/t, 216 kg/t, and 458 kg/t, respectively. Consequently, the advancement of a new low-carbon cement clinker, primarily composed of minerals such as $C_2S$, $C_4A_3\$$, and $C_5S_2\$$, which have lower calcium content and reduced energy requirements, emerges as practical strategy for accomplishing carbon reduction within the cement industry.

Calcium sulfoaluminate cement clinker mainly consists of minerals such as $C_4A_3\$$, $C_2S$, and tetracalcium aluminoferrite ($C_4AF$). Despite being classified as low-carbon cement clinker, the manufacturing of calcium sulfoaluminate cement clinker demands substantial utilization of non-renewable resources, particularly high-quality bauxite ($Al_2O_3$>60%). Consequently, the manufacturing process results in elevated expenses and restricts the broad-scale implementation of calcium sulfoaluminate cement clinker. Furthermore, calcium sulfoaluminate cement demonstrates limited strength growth during the later stages, and there is even a risk for decreased strength, which primarily qualifies calcium sulfoaluminate cement for use in urgent construction projects.

To address the aforementioned technical shortcomings, the disclosure augments the content of belite or incorporates ternesite to produce a low-carbon cement clinker. This results in an improved performance of the conventional calcium sulfoaluminate cement clinker as it undergoes the maturation and advancement processes following its production. The hydration of cement clinker involves intricate interactions among different compounds. For instance, the hydration products of $C_4A_3\$$ stimulate the hydration of $C_5S_2\$$, and excessive hydration products of $C_5S_2\$$ will inhibit the hydration of $C_2S$. As a result, it is crucial to plan and regulate the proportions of different minerals. The disclosure addresses the challenge of controlling the compositional ratio between minerals in the low-carbon cement clinker, achieving targeted and stable control to produce the low-carbon cement clinker with outstanding performance in both the early and later stages.

SUMMARY

The disclosure provides a method for formulating and preparing a low-carbon cement clinker. The low-carbon cement clinker features reduced carbon emissions and outstanding performance, with higher strengths in both the early and late stages in comparison to ordinary Portland cement clinker.

The composition of the low-carbon cement clinker is defined by the specific ranges of values for the following parameters:

- alkalinity coefficient C: $1.0 \leq C \leq 1.5$;
- aluminum-sulfur ratio P: $P < 1.92$;
- aluminum-silicon ratio N: $N < 1$; and
- limestone saturation coefficient Cs: $0.9 \leq Cs < 1.0$.

In a class of this embodiment, the low-carbon cement clinker comprises raw materials as follows:

- limestone or low-grade limestone (limestone with a CaO content of less than 45%);
- bauxite, low-grade bauxite (bauxite with an $Al_2O_3$ content of less than 50%), fly ash, alumina ash, red mud or coal gangue;
- phosphogypsum, desulfurization gypsum or anhydrite;
- sandstone or silica; and
- slag, steel slag, carbide slag, or lithium slag.

A method for preparing the low-carbon cement clinker, comprising:

(1) measuring chemical compositions of the raw materials to identify the levels of oxides in each type of the raw materials;

(2) designing the composition of the oxides in the low-carbon cement clinker using the specific ranges of alkalinity coefficient C, alumina-sulfur ratio P, alumina-silica ratio N, and limestone saturation coefficient Cs; or, using the specific ranges of alkalinity coefficient C, alumina-sulfur ratio P, alumina-silica ratio N, and limestone saturation coefficient Cs, to determine the specific values of the parameters, and deriving the composition of the oxides in the low-carbon cement clinker;

(3) calculating the ratios of the raw materials in the low-carbon cement clinker according to the levels of the oxides in each type of the raw materials and the composition of the oxides in the low-carbon cement clinker;

(4) weighing the raw materials according to the calculated ratios determined in 3); grinding and mixing the raw materials to obtain a raw mixture;

(5) calcinating the raw mixture at 1100-1350° C. for 30-120 minutes; and (6) cooling the calcined raw mixture through a grate cooler or laboratory-based air cooling methods; adding a certain amount of gypsum to the cooled raw mixture; grinding the resulting mixture to achieve a fineness with a specific surface area of 300-350 $m^2$/kg or a residue of below 20% on a 45 μm sieve, thereby producing the low-carbon cement clinker.

In a class of this embodiment, in 2), the specific values of the parameters are calculated using the following formulas:

$$C = \frac{CaO}{0.73 \times (Al_2O_3 - 0.64 \times Fe_2O_3) + 1.4 \times Fe_2O_3 + 1.87 \times SiO_2},$$

$$P = \frac{Al_2O_3 - 0.64 \times Fe_2O_3}{SO_3},$$

$$N = \frac{Al_2O_3 - 0.64 \times Fe_2O_3}{SiO_2}, \text{ and}$$

$$Cs = \frac{CaO}{0.73 \times (Al_2O_3 - 0.64 \times Fe_2O_3) + 1.4 \times Fe_2O_3 + 1.87 \times SiO_2 + 0.7 \times SO_3};$$

where, five oxides CaO, $Al_2O_3$, $SO_3$, $SiO_2$, and $Fe_2O_3$ are expressed as percentages by mass; the limestone saturation coefficient Cs considers the content of $SO_3$ to regulate the proportion of lime and silicate, and is adjusted based on the alkalinity coefficient C.

The following advantages are associated with the disclosure.

1. The disclosure provides a specific range of each parameter value for the low-carbon cement clinker. These specific ranges enable control over the proportions and composition of different minerals in the low-carbon cement clinker.
2. The specific range of each parameter value ensures an idea ratio of mineral composition in the low-carbon cement clinker. The ratio promotes a coordinated interaction among different minerals and compounds present when exposed to water, leading to improved strength development and overall performance of the final cement product.
3. Considering the constraint of the conventional alkalinity coefficient C in the conventional cement clinker, along with the characteristics of mineral composition and content in the low-carbon cement clinker, a revised alkalinity coefficient C termed the limestone saturation coefficient Cs is introduced. This adjustment improves the scientific and standardized formulation of the low-carbon cement clinker, rendering it better suitable for practical production processes.
4. Use of the low-carbon cement clinker leads to a substantial decrease in carbon emissions. Unlike Portland cement clinker, the low-carbon cement clinker allows for a reduction in calcination temperature by more than 100° C. This reduction translates to a decrease in energy consumption by over 10%, a reduction in limestone usage by more than 10%, and a carbon dioxide emission decrease exceeding 20%. These advancements play a vital role in attaining the cement industry's objective for "dual carbon" target.
5. The raw materials employed in the low-carbon cement clinker are sourced from diverse origins. The lowered calcium content and reduced carbonization features enhance the feasibility of utilizing different low-grade or industrial byproducts, such as low-grade limestone, phosphogypsum, fly ash, and red mud. This leads to a significant reduction in production costs for companies and provides substantial economic and socio-environmental benefits.

The low-carbon cement clinker demonstrates outstanding performance, comparable to or even exceeding that of the current Portland cement clinker. This highlights its promising versatility for broad implementation and as a feasible alternative to the ordinary Portland cement, which in turns contributes significantly to the sustainable advancement of the cement industry.

DETAILED DESCRIPTION

Figure 1:
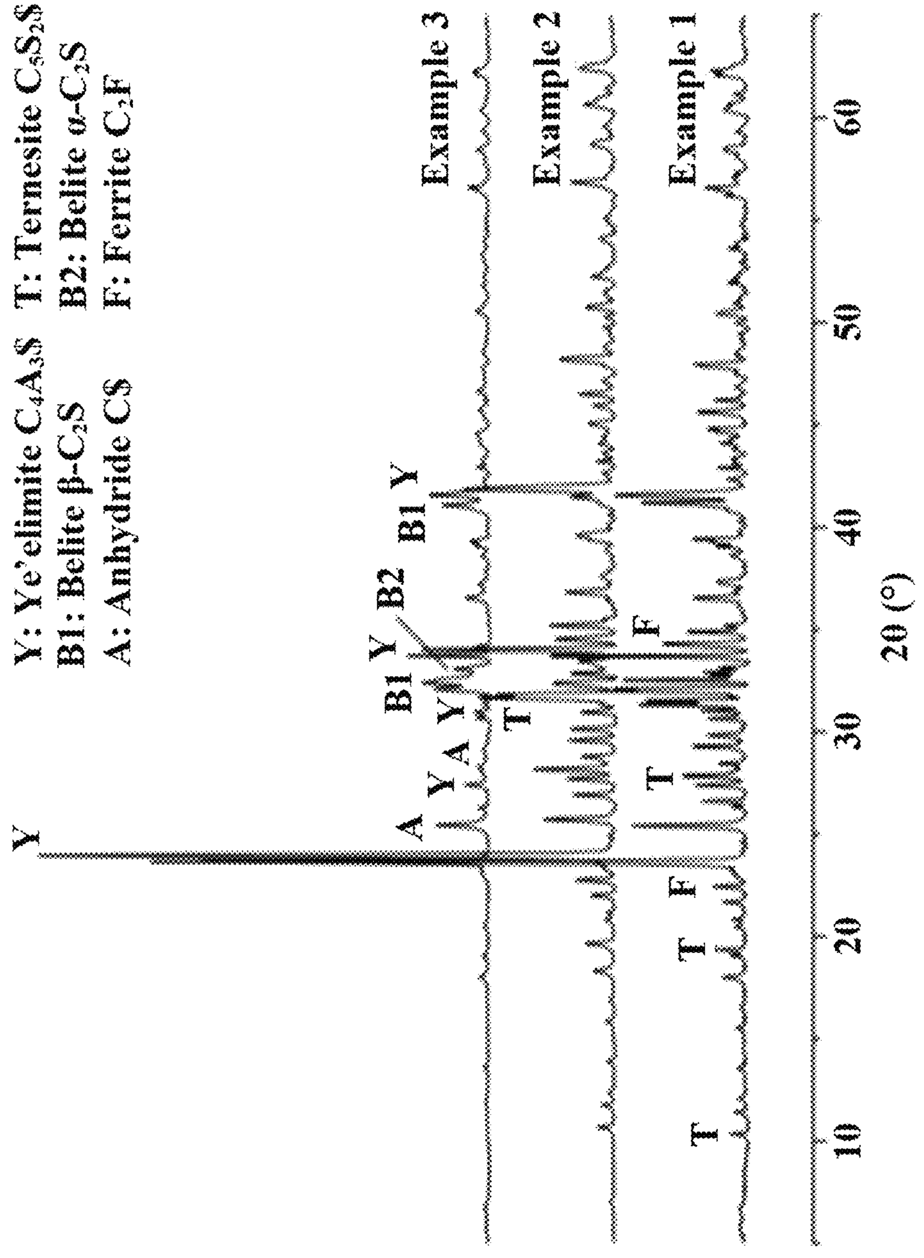
FIG. 1 shows an X-ray diffraction (XRD) pattern of a low-carbon cement clinker according to Examples 1-3 of the disclosure.

To further illustrate the disclosure, embodiments detailing a low-carbon cement clinker and a method for preparing the same are described below. It should be noted that the following embodiments are intended to describe and not to limit the disclosure.

The composition of the low-carbon cement clinker is defined by the specific ranges of values for the following parameters:

alkalinity coefficient C: $1.0 \leq C \leq 1.5$;

aluminum-sulfur ratio P: $P < 1.92$;

aluminum-silicon ratio N: $N < 1$; and limestone saturation coefficient Cs: $0.9 \leq Cs < 1.0$;

The low-carbon cement clinker comprises five types of raw materials, comprising:

limestone or low-grade limestone (limestone with a CaO content of less than 45%);

bauxite, low-grade bauxite (bauxite with an $Al_2O_3$ content of less than 50%), fly ash, alumina ash, red mud or coal gangue;

phosphogypsum, desulfurization gypsum or anhydrite;

sandstone or silica; and slag, steel slag, carbide slag, or lithium slag.

A method for preparing the low-carbon cement clinker, comprising:

(1) measuring chemical compositions of the raw materials to identify the levels of oxides in each type of the raw materials;

(2) designing the composition of the oxides in the low-carbon cement clinker using the specific ranges of alkalinity coefficient C, alumina-sulfur ratio P, alumina-silica ratio N, and limestone saturation coefficient Cs; or, using the specific ranges of alkalinity coefficient C, alumina-sulfur ratio P, alumina-silica ratio N, and limestone saturation coefficient Cs, to determine the specific values of the parameters, and deriving the composition of the oxides in the low-carbon cement clinker;

(3) calculating the ratios of the raw materials in the low-carbon cement clinker according to the levels of the oxides in each type of the raw materials and the composition of the oxides in the low-carbon cement clinker;

(4) weighing the raw materials according to the calculated ratios determined in 3); grinding and mixing the raw materials to obtain a raw mixture;

(5) calcinating the raw mixture at 1100-1350° C. for 30-120 minutes; and (6) cooling the calcined raw mixture through a grate cooler or laboratory-based air cooling methods; adding a certain amount of gypsum to the cooled raw mixture; grinding the resulting mixture to achieve a fineness with a specific surface area of 300-350 $m^2$/kg or a residue of below 20% (preferably below 15%) on a 45 μm sieve, thereby producing the low-carbon cement clinker.

In a class of this embodiment, in 2), the specific values of the parameters are calculated using the following formulas:

$$C = \frac{CaO}{0.73\times(Al_2O_3 - 0.64\times Fe_2O_3) + 1.4\times Fe_2O_3 + 1.87\times SiO_2},$$

$$P = \frac{Al_2O_3 - 0.64\times Fe_2O_3}{SO_3},$$

$$N = \frac{Al_2O_3 - 0.64\times Fe_2O_3}{SiO_2}, \text{ and}$$

$$Cs = \frac{CaO}{0.73\times(Al_2O_3 - 0.64\times Fe_2O_3) + 1.4\times Fe_2O_3 + 1.87\times SiO_2 + 0.7\times SO_3};$$

where, five oxides CaO, $Al_2O_3$, $SO_3$, $SiO_2$, and $Fe_2O_3$ are expressed as percentages by mass; the limestone saturation coefficient Cs considers the content of $SO_3$ to regulate the proportion of lime and silicate, and is adjusted based on the alkalinity coefficient C.

The requirement to define specific ranges of the parameter values for the oxide composition of the low-carbon cement clinker arises from the following considerations: the strength properties of the cement clinker depend on the interactive and cooperation of diverse minerals throughout the hydration procedure. The specific ranges ensure that the mineral composition of the low-carbon cement clinker is in an optimally balanced and well-matched state. While enhancing the reactivity of low-activity minerals such as calcium sulfoaluminate and belite in the low-carbon cement clinker, the specific ranges also ensure the optimal balance in the content ratios of crucial minerals, such as calcium sulfoaluminate, to minerals like free gypsum or belite in the low-carbon cement clinker. Moreover, the specific ranges achieve the optimal spatial and temporal coordination and collaboration between crystalline hydration products such as ettringite and gel-like hydration products like calcium silicate hydrate (C—S—H), ensuring excellent performance throughout the early, mid, and late-stage of the low-carbon cement clinker.

Compared to current methods that involves a secondary calcination step for the conventional cement clinkers containing minerals like calcium sulfoaluminate, the low-carbon cement clinker requires just a single calcination step. This simplifies the process, reduces energy use, decreases emissions, lowers costs, and improves production efficiency.

The disclosed method modifies the specific ranges of the parameter values for the cement clinker to control the mineral composition ratios in the low-carbon cement clinker. The early strength of the cement depends on rapid hydration of clinker mineral $C_4A_3$\$, the mid-stage strength is aided by the hydration of $C_5S_2$\$, and the later-stage strength primarily arises from the hydration of $C_2S$. The hydration processes of various minerals in the cement clinker are interrelated rather than independent. Hence, a well-founded choice and regulation of mineral components in the cement clinker contribute to creating a low-carbon cement clinker with outstanding performance and application results.

To clarify the disclosure and enhance understanding of the technical solutions and benefits, the following will offer a detailed description of the disclosure using examples and accompanying illustrations.

Tables 1 show the oxide compositions of the raw materials used in the examples.

TABLE 1

Oxide compositions of raw materials (wt. %)

| Raw material | Weight Percentage (wt. %) | | | | | | |
|---|---|---|---|---|---|---|---|
| types | LOI | $SiO_2$ | $Al_2O_3$ | $Fe_2O_3$ | CaO | MgO | $SO_3$ |
| Limestone | 42.64 | 0.61 | 0.05 | 0.19 | 55.9 | 0.01 | 0.42 |
| Bauxite | 16.00 | 21.72 | 52.40 | 7.63 | | | / |
| Fly ash | 2.32 | 52.47 | 34.02 | 2.92 | 4.80 | 0.69 | 0.27 |
| Phosphogypsum | 6.12 | 1.03 | 0.60 | 0.25 | 38.61 | 2.57 | 49.89 |

Example 1

Tables 2 and 3 show rate values and corresponding oxide compositions for a low-carbon cement clinker prepared in the example.

TABLE 2

Rate values for a low-carbon cement clinker prepared in Example 1

| Rate value | Cs | C | P | N |
|---|---|---|---|---|
| Numerical value | 0.95 | 1.09 | 1.49 | 0.84 |

TABLE 3

Oxide compositions of a low-carbon cement clinker prepared in Example 1

| Oxide | CaO | $Al_2O_3$ | $SO_3$ | $SiO_2$ | $Fe_2O_3$ |
|---|---|---|---|---|---|
| Weight percentage wt. % | 52.56 | 16.73 | 10.11 | 17.97 | 2.63 |

The raw materials, comprising fly ash, phosphogypsum, limestone, and bauxite were finely ground. Following the specific rate values, the oxide compositions were established, and the raw materials are proportioned based on the oxide components. The raw materials were weighted, ground and mixed in a mill to form a raw mixture. The raw mixture was blend with a certain amount of water or alcohol, pressed into a circular thin cake with a diameter of 3 cm, and subsequently dried in a drying oven. Next, the circular thin cake was heated in a high-temperature electric furnace using a silicon molybdenum rod. The temperature was gradually increased at a rate of 5° C./min until it reached 1200° C., at which point it was held steady for 30 minutes. After heating, the circular thin cake was removed and swiftly cooled using airflow, resulting in the formation of a clinker block. The clinker block was then crushed and finely ground. Measurement revealed that the finely ground clinker left a residue of 8.9% on a 45 μm sieve.

Example 2

Tables 4 and 5 show rate values and corresponding oxide compositions for a low-carbon cement clinker prepared in the example.

TABLE 4

Rate values for a low-carbon cement clinker prepared in Example 2

| Rate value | Cs | C | P | N |
|---|---|---|---|---|
| Numerical value | 0.947 | 1.16 | 1.08 | 0.95 |

TABLE 5

Oxide compositions of a low-carbon cement clinker prepared in Example 2

| Oxide | CaO | $Al_2O_3$ | $SO_3$ | $SiO_2$ | $Fe_2O_3$ |
|---|---|---|---|---|---|
| Weight percentage wt. % | 51.0 | 16.68 | 13.93 | 15.75 | 2.64 |

The raw materials, comprising fly ash, phosphogypsum, limestone, and bauxite were finely ground. Following the specific rate values, the oxide compositions were established, and the raw materials are proportioned based on the oxide components. The raw materials were weighted, ground and mixed in a mill to form a raw mixture. The raw mixture was blend with a certain amount of water or alcohol, pressed into a circular thin cake with a diameter of 10 cm, and subsequently dried in a drying oven. Next, the circular thin cake was heated in a high-temperature electric furnace using a silicon molybdenum rod. The temperature was gradually increased at a rate of 5° C./min until it reached 1250° ° C., at which point it was held steady for 60 minutes. After heating, the circular thin cake was removed and swiftly cooled using airflow, resulting in the formation of a clinker block. The clinker block was then crushed and finely ground. Measurement revealed that the finely ground clinker left a residue of 9.1% on a 45 μm sieve.

Example 3

Tables 6 and 7 show rate values and corresponding oxide composition for a low-carbon cement clinker prepared in the example.

TABLE 6

Rate values for a low-carbon cement clinker prepared in Example 3

| Rate value | Cs | C | P | N |
|---|---|---|---|---|
| Numerical value | 0.949 | 1.08 | 1.53 | 0.78 |

TABLE 7

Oxide composition of a low-carbon cement clinker prepared in Example 3

| Oxide | CaO | $Al_2O_3$ | $SO_3$ | $SiO_2$ | $Fe_2O_3$ |
|---|---|---|---|---|---|
| Weight percentage wt. % | 53.25 | 16.05 | 9.8 | 19.25 | 1.65 |

The raw materials, comprising fly ash, phosphogypsum, limestone, and bauxite were finely ground. Following the specific rate values, the oxide compositions were established, and the raw materials are proportioned based on the oxide components. The raw materials were weighted, ground and mixed in a mill to form a raw mixture. The raw mixture was blend with a certain amount of water or alcohol, pressed into a circular thin cake with a diameter of 10 cm, and subsequently dried in a drying oven. Next, the circular thin cake was heated in a high-temperature electric furnace using a silicon molybdenum rod. The temperature was gradually increased at a rate of 5° C./min until it reached 1300° ° C., at which point it was held steady for 50 minutes. After heating, the circular thin cake was removed and swiftly cooled using airflow, resulting in the formation of a clinker block. The clinker block was then crushed and finely ground. Measurement revealed that the finely ground clinker left a residue of 8.7% on a 45 μm sieve.

X-Ray Diffraction (XRD) Analysis

XRD analyses were performed on the low-carbon cement clinkers prepared in Examples 1 to 3. The scanning rate was set at 4°/min, using a step size of 0.01°. The results of the XRD analyses are shown in FIG. 1. FIG. 1 reveals the absence of significant diffraction peaks associated with free lime (f-CaO), indicating the complete formation of the low-carbon cement clinker at the specific temperature. In Example 1, the low-carbon cement clinker was calcined at 1200° C., while in Example 2, the low-carbon cement clinker was calcined at 1250° C. A strong diffraction peak of $C_5S_2\$$ in the low-carbon cement clinker from Examples 1 and 2 confirms successful formation of $C_5S_2\$$ under these experimental conditions, with a well-developed crystalline structure. Furthermore, the low-carbon cement clinker from Example 3, calcined at 1300° C., exhibits the presence of high-activity $\alpha$-$C_2S$. The results indicate that under the specified rate values, the mineral compositions of the cement clinker achieve an optimal equilibrium. This condition allows for the cocurrent presence of the low-activity minerals like $C_5S_2\$$ and coexisting-challenging minerals like $C_4A_3\$$ in the low-carbon cement clinker, while maintaining heightened crystalline activity in both the low-activity minerals $C_5S_2\$$ and $C_2S$. Moreover, the rate values ensure a specific quantity of f-$CaSO_4$ within the low-carbon cement clinker. The presence of f-$CaSO_4$ facilitates the formation of ettringite through hydration reactions involving $C_4A_3\$$, consequently enhancing the development of cement strength. Furthermore, a slightly elevated content of f-$CaSO_4$ within the low-carbon cement clinker ensures the formation and endurance of $C_5S_2\$$ in specific temperature conditions, simultaneously promoting the transformation of the low-activity mineral $C_2S$ within the low-carbon cement clinker into $\alpha$-$C_2S$.

Compressive Strength Testing of Cement Mortar

Figure 2:
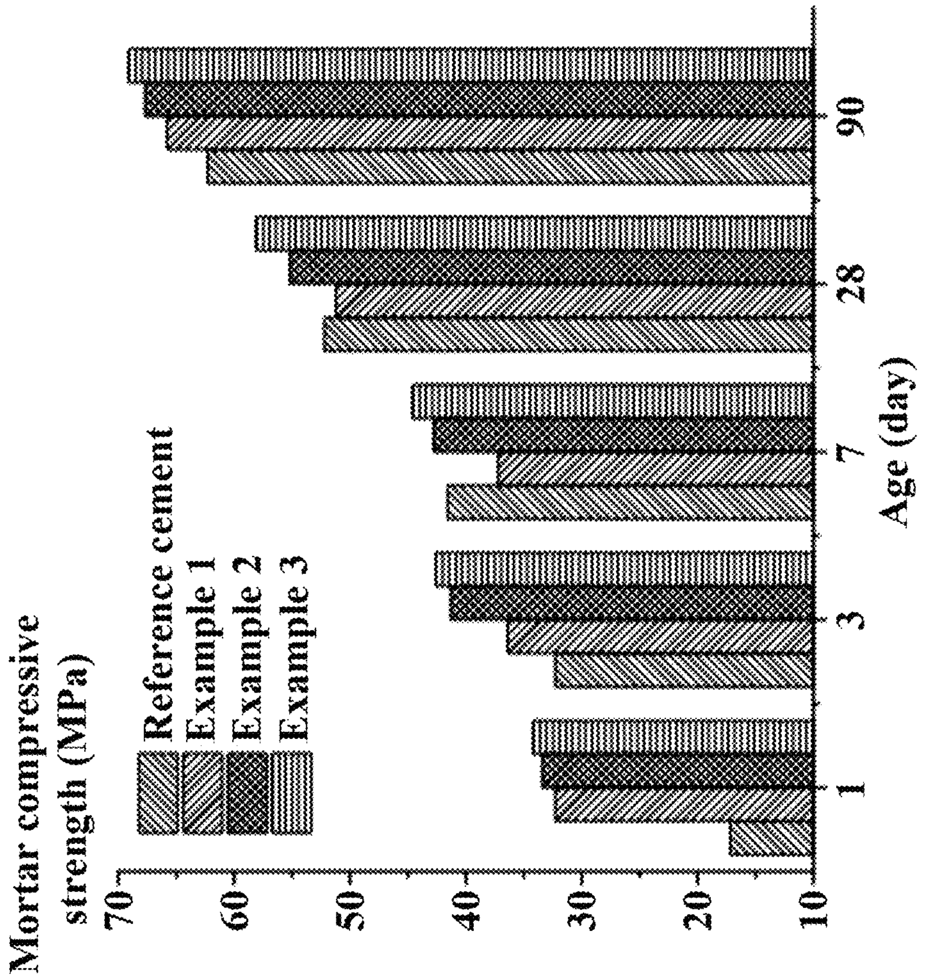
FIG. 2 illustrates the strength of mortars made from a low-carbon cement clinker according to Examples 1-3 of the disclosure, along with the comparison to the performance of ordinary Portland cement at intervals of 1 day, 3 days, 7 days, and 28 days.

In each example, the low-carbon cement clinker was supplemented with an appropriate quantity of gypsum, maintaining a water-to-binder ratio of 0.5 and a sand-to-binder ratio of 3. The resulting mixture was used for conducting a test on mortar strength. A reference cement was used for comparative purposes, undergoing the same mortar strength test while adhering to identical water-to-binder ratio and sand-to-binder ratio. The compressive strengths of both the reference cement and the cement mortars made from the low-carbon cement clinker in Examples 1-3 were evaluated at different curing periods, especially at 1 day, 3 days, 7 days, 28 days, and 90 days, as depicted in FIG. 2. FIG. 2 indicates that the cement mortar made from the low-carbon cement clinker exhibits higher strengths at 1 day and 3 days, in contrast to the reference cement. The cement mortar made from the low-carbon cement clinker achieves a strength level equivalent to the 7-day strength of the reference cement in just 3 days. The 28-day strength of the cement mortar, prepared from the low-carbon cement clinker, is comparable to that of the reference cement. Furthermore, as time progresses, the 90-day strength of the cement mortar prepared from the low-carbon cement clinker gradually exceeds that of the reference cement. The strength performance of the cement clinker is determined by the optimized combination of various minerals within the cement clinker. When exposed to the specific rate values, the cement clinker ensures the optimal mineral proportions, fostering a synergistic hydration effect among the minerals and bolstering the strength stability. Additionally, the low-carbon cement clinker exhibits comparable or even superior performance compared to the ordinary Portland cement clinker. The results suggest that the potential of the low-carbon cement clinker to replace the ordinary Portland cement clinker, ultimately contributing to a decrease in carbon emissions.

It will be obvious to those skilled in the art that changes and modifications may be made, and therefore, the aim in the appended claims is to cover all such changes and modifications.

What is claimed is:

1. A low-carbon cement clinker, having the following parameter ranges:

alkalinity coefficient C: $1.0 \leq C \leq 1.5$;

aluminum-sulfur ratio P: $P < 1.92$;

aluminum-silicon ratio N: $N < 1$; and limestone saturation coefficient Cs: $0.9 \leq Cs < 1.0$.

2. The low-carbon cement clinker of claim 1, wherein the low-carbon cement clinker comprises raw materials as follows:

limestone or low-grade limestone;

bauxite, low-grade bauxite, fly ash, alumina ash, red mud, or coal gangue;

phosphogypsum, desulfurization gypsum, or anhydrite;

sandstone or silica; and slag, steel slag, carbide slag, or lithium slag.

3. A method for preparing the low-carbon cement clinker of claim 1, the method comprising:

(1) measuring chemical compositions of the raw materials to identify the levels of oxides in each type of the raw materials;

(2) designing the composition of the oxides in the low-carbon cement clinker using the specific ranges of alkalinity coefficient C, alumina-sulfur ratio P, alumina-silica ratio N, and limestone saturation coefficient Cs; or, using the specific ranges of alkalinity coefficient C, alumina-sulfur ratio P, alumina-silica ratio N, and limestone saturation coefficient Cs, to determine the specific values of the parameters, and deriving the composition of the oxides in the low-carbon cement clinker;

(3) calculating the ratios of the raw materials in the low-carbon cement clinker according to the levels of the oxides in each type of the raw materials and the composition of the oxides in the low-carbon cement clinker;

(4) weighing the raw materials according to the calculated ratios determined in 3); grinding and mixing the raw materials to obtain a raw mixture;

(5) calcinating the raw mixture at 1100-1350° C. for 30-120 minutes; and (6) cooling the calcined raw mixture through a grate cooler or laboratory-based air cooling methods; adding a certain amount of gypsum to the cooled raw mixture; grinding the resulting mixture to achieve a fineness with a specific surface area of 300-350 $m^2$/kg or a residue of below 20% on a 45 μm sieve, thereby producing the low-carbon cement clinker.

4. The method of claim 3, wherein in 2), the specific values of the parameters are calculated using the following formulas:

$$C = \frac{CaO}{0.73 \times (Al_2O_3 - 0.64 \times Fe_2O_3) + 1.4 \times Fe_2O_3 + 1.87 \times SiO_2},$$

$$P = \frac{Al_2O_3 - 0.64 \times Fe_2O_3}{SO_3},$$

$$N = \frac{Al_2O_3 - 0.64 \times Fe_2O_3}{SiO_2}, \text{ and}$$

$$Cs = \frac{CaO}{0.73 \times (Al_2O_3 - 0.64 \times Fe_2O_3) + 1.4 \times Fe_2O_3 + 1.87 \times SiO_2 + 0.7 \times SO_3};$$

where, five oxides CaO, $Al_2O_3$, $SO_3$, $SiO_2$, and $Fe_2O_3$ are expressed as percentages by mass; the limestone saturation coefficient Cs considers the content of $SO_3$ to regulate the proportion of lime and silicate, and is adjusted based on the alkalinity coefficient C.

* * * * *